US009661374B1

(12) United States Patent
Erdmann et al.

(10) Patent No.: US 9,661,374 B1
(45) Date of Patent: May 23, 2017

(54) EXCHANGE AND OFFLINE SUBSTITUTION OF ADVERTISEMENTS

(75) Inventors: David Erdmann, Edmonds, WA (US); Brett R. Taylor, Bainbridge Island, WA (US); Jonathan A. Jenkins, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 726 days.

(21) Appl. No.: 13/479,140

(22) Filed: May 23, 2012

(51) Int. Cl.
*H04N 21/433* (2011.01)
*G06F 17/30* (2006.01)
*G06Q 30/02* (2012.01)

(52) U.S. Cl.
CPC ... *H04N 21/4331* (2013.01); *G06F 17/30902* (2013.01); *G06Q 30/0277* (2013.01)

(58) Field of Classification Search
CPC combination set(s) only.
See application file for complete search history.

(56) References Cited

U.S. PATENT DOCUMENTS

| 7,054,917 | B1 * | 5/2006 | Kirsch | H04L 67/2847 |
| | | | | 707/999.003 |
| 8,086,725 | B1 | 12/2011 | Liang et al. | |
| 8,621,046 | B2 * | 12/2013 | Hussain | G06Q 30/02 |
| | | | | 707/705 |
| 2002/0004855 | A1 * | 1/2002 | Cox | G06Q 30/02 |
| | | | | 719/328 |
| 2003/0139966 | A1 * | 7/2003 | Sirota | G06Q 30/02 |
| | | | | 705/14.41 |
| 2005/0273514 | A1 * | 12/2005 | Milkey | H04L 29/06027 |
| | | | | 709/232 |
| 2006/0271425 | A1 * | 11/2006 | Goodman | G06Q 30/02 |
| | | | | 705/14.58 |
| 2007/0174624 | A1 * | 7/2007 | Wolosewicz | G06F 21/10 |
| | | | | 713/176 |
| 2010/0205213 | A1 * | 8/2010 | Broder | G06F 17/30457 |
| | | | | 707/780 |
| 2010/0332328 | A1 | 12/2010 | Dharmaji et al. | |
| 2011/0153426 | A1 | 6/2011 | Reddy et al. | |
| 2011/0184936 | A1 * | 7/2011 | Lymberopoulos | G06F 17/30902 |
| | | | | 707/721 |

(Continued)

*Primary Examiner* — William A Brandenburg
*Assistant Examiner* — Marie Brady
(74) *Attorney, Agent, or Firm* — Knobbe Martens Olson & Bear LLP

(57) ABSTRACT

Various features are described for caching, tagging, and exchanging advertisements associated with network-accessible content. Advertisements may be retrieved and cached on mobile devices and other types of client devices prior to obtaining content containing references to advertisements. When content with an embedded reference to an advertisement is obtained, a previously retrieved advertisement can be loaded from the cache. Advertisements may also be tagged for later viewing. Users may revisit tagged advertisements at a future time, such as when wireless network connectivity is restored or when the user has more available time. Additional features facilitate bidding, by an advertisement server directly or indirectly associated with a client device, on advertising inventory associated with requested network content. In response to acceptance of the bid by a 3rd party advertising server, an advertisement from the associated advertisement server may be displayed.

28 Claims, 9 Drawing Sheets

(56) References Cited

U.S. PATENT DOCUMENTS

2011/0191321 A1* 8/2011 Gade ................... G06F 12/08
707/709
2013/0110643 A1* 5/2013 Goyal .................. G06Q 30/02
705/14.68

* cited by examiner

Figure 2B:
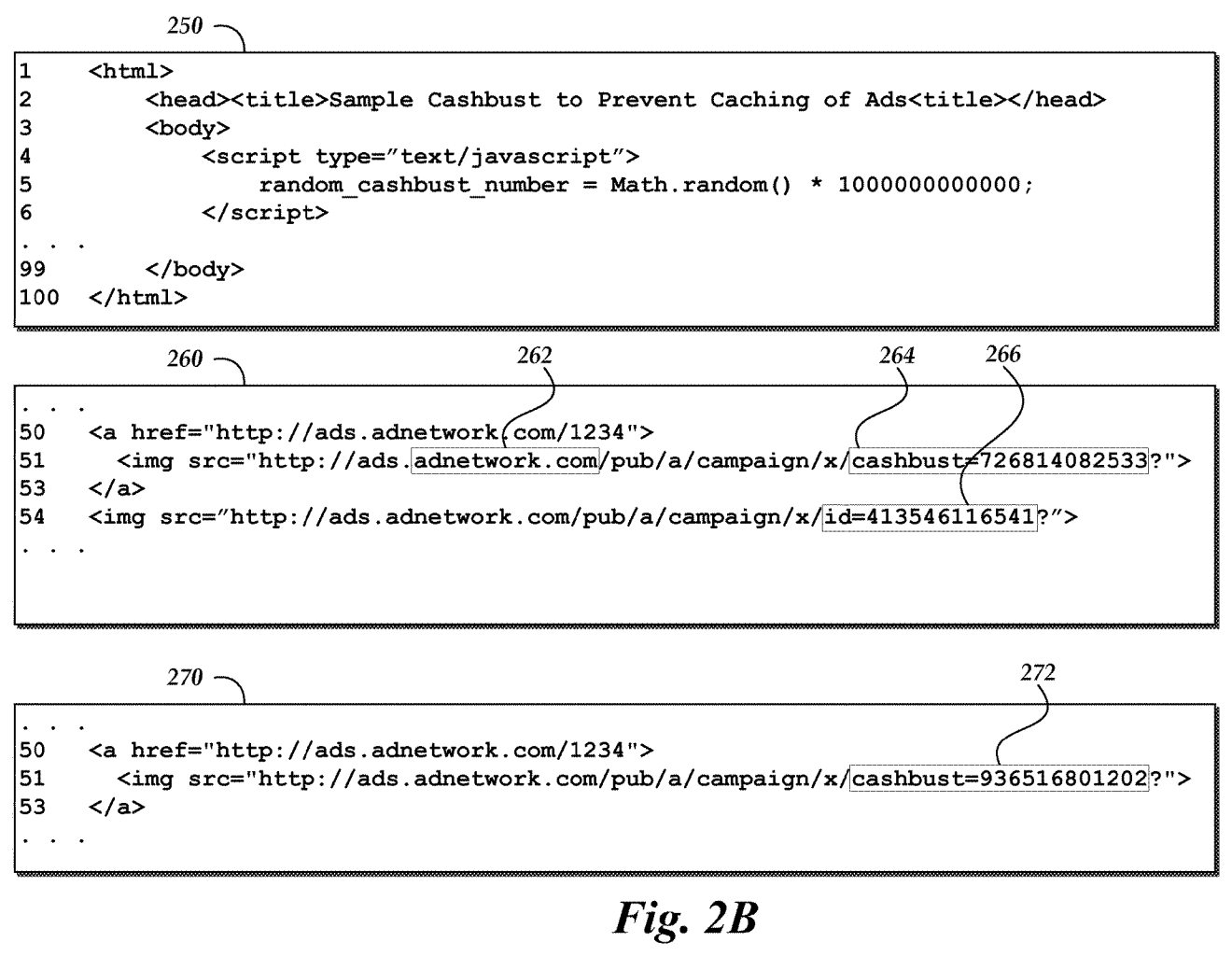

```
250
1  <html>
2    <head><title>Sample Cashbust to Prevent Caching of Ads<title></head>
3    <body>
4      <script type="text/javascript">
5        random_cashbust_number = Math.random() * 10000000000000;
6      </script>
  .
  .
99   </body>
100 </html>
```

```
260
 .
 .
50  <a href="http://ads.adnetwork.com/1234">
51    <img src="http://ads.adnetwork.com/pub/a/campaign/x/id=41354611654?/cashbust=72681408253?">
53  </a>
54  <img src="http://ads.adnetwork.com/pub/a/campaign/x/id=41354611654?">
 .
 .
```

262  264  266

```
270
 .
 .
50  <a href="http://ads.adnetwork.com/1234">
51    <img src="http://ads.adnetwork.com/pub/a/campaign/x/cashbust=93651680120?">
53  </a>
 .
 .
```

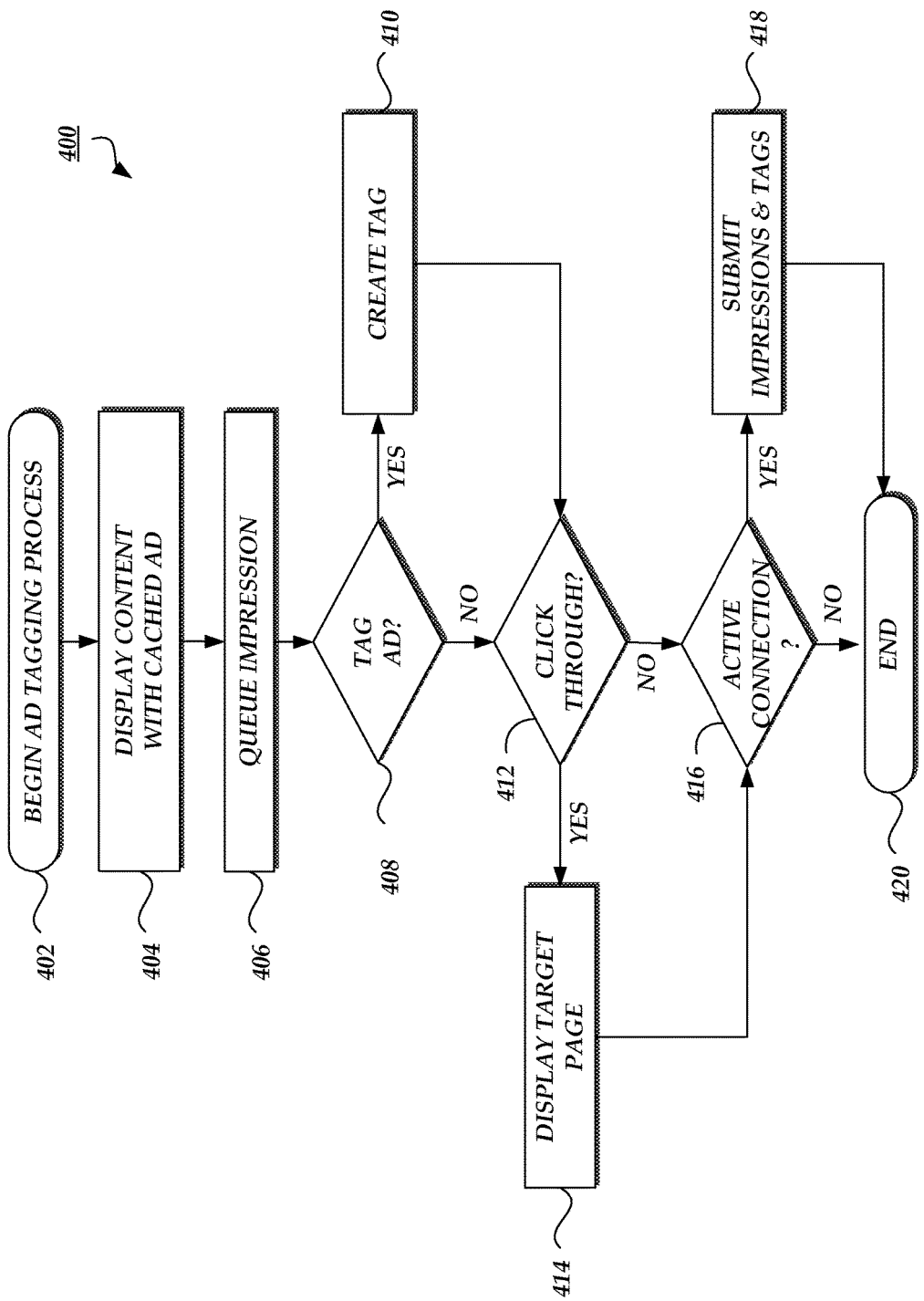

EXCHANGE AND OFFLINE SUBSTITUTION OF ADVERTISEMENTS

BACKGROUND

Computing devices often request content from other computing devices over a network. In a common application, the computing device operated by a requesting user is referred to as the client, and the computing device or system operated by the content provider that responds to the request is the server. A client and server may communicate over an intranet, the Internet, or any other communication network. Content providers often reserve areas of their content for advertisements. Advertisers can purchase the available space, referred to as inventory, to display their advertisements. Advertisers and content providers typically employ an advertisement server or an advertising network of servers to facilitate the sale of inventory and the distribution of advertisements.

Clients receive and process content (e.g., web pages) from content servers, and then retrieve and process advertisements associated with the content from an advertisement server. The retrieval and processing of the advertisements may cause a user of the client to experience delays and performance degradation due to the retrieval of the advertisement in addition to or after the retrieval and initial processing of the requested content. Moreover, when a user of a client is browsing content offline, advertisements associated with the content may not be available, resulting in unused inventory for content providers and lost advertising opportunities for advertisers.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2B is a code sample illustrating HTML source code with executable code, advertisements, and impression recordation objects;

FIG. 4A is a flow diagram of an illustrative process for tagging and interacting with advertisements;

DETAILED DESCRIPTION OF SPECIFIC EMBODIMENTS

Introduction

The present disclosure is directed to caching, tagging, and exchanging advertisements associated with network-accessible content, including but not limited to web pages. Specifically, aspects of the disclosure will be described with respect to the retrieval and caching of advertisements, at a client device and/or at an intermediary system between the client device and a content provider. In response to retrieving a content page with an embedded reference to an advertisement, a previously retrieved advertisement can be loaded from the cache, bypassing the need for a subsequent request for the referenced advertisement from a third party advertisement server. Impressions of cached advertisements that are subsequently displayed can be tracked and reported to facilitate accurate impression counts for advertisers that pay for each advertisement impression. In some embodiments, the tracking and reporting of impressions can be implemented without changes to existing advertisement servers. Further aspects of the disclosure will be described with respect to tagging advertisements for later viewing. A user may tag advertisements when viewing content so that the user can view more information about the advertisement at a future time, such as when network connectivity is restored or when the user has more available time. Still further aspects of the disclosure will be described with respect to bidding on advertising inventory associated with requested network content, and substitution of advertisements in response to acceptance of the bid by a 3rd party advertising server.

Although aspects of the embodiments described in the disclosure will focus, for the purpose of illustration, on a client device or an intermediary system, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Example of a Networked Computing Environment

Figure 1:
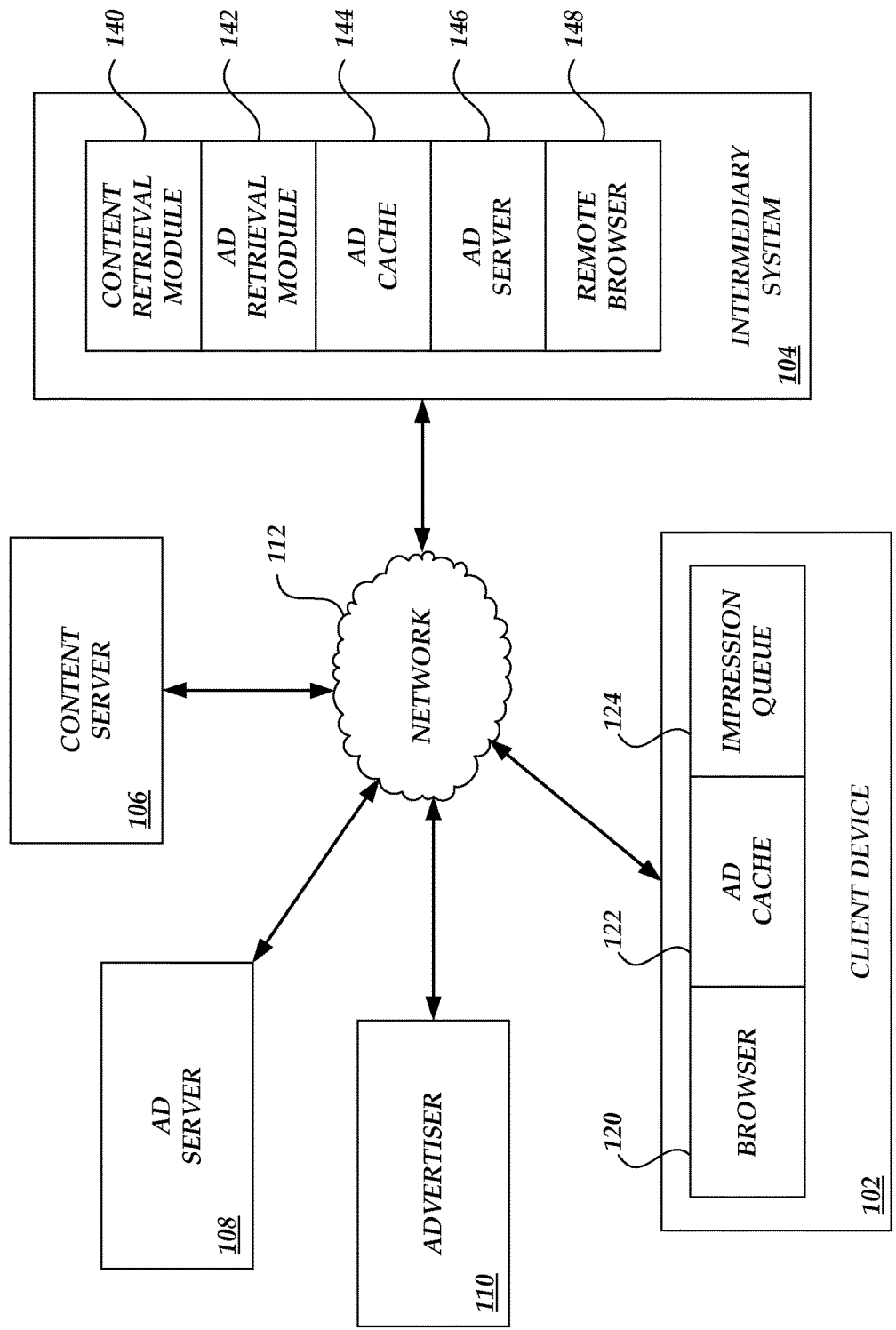
FIG. 1 is a block diagram of an illustrative content delivery environment including a client device, an intermediary system, and a number of third party advertising entities and content providers.

FIG. 1 is a block diagram illustrative of a networked computing environment for the retrieval, processing, and display of network-accessible content. In some embodiments, the content may include content pages, such as web pages and other documents. The content pages may include any combination of text, images, videos, animation, interactive features, and the like. Content providers often make areas of their content available to advertisers. The areas available to display advertisements may be referred to as inventory. Advertisers purchase or otherwise reserve available inventory in which to display their advertisements. The advertisements may include any type of network-accessible content, such as text, images, videos, animations, and combinations thereof. In a typical implementation, content providers and advertisers associate with an advertisement server. For example, content providers may modify content such that the available inventory can include advertisements from the advertisement server, and advertisers submit their advertisements to the advertisement server for distribution. The advertisement server can shield the advertisers and content providers from the details of advertisement distribution, impression tracking, payment, and the like. In addition, an advertiser need not know that its advertisements are distributed to specific consumers or associated with content from a specific content provider, and a content provider need not know that its content includes any specific advertisements.

As illustrated in FIG. 1, a network computing environment may include a client device 102, an intermediary system 104, a content server 106, an advertisement server 108, and an advertiser 110. Typically, the advertisement server 108 will serve the ads of many advertisers 110 to many client devices 102 for display on the pages or sites of many participating content providers 106. The intermediary system 104 interact with many content providers 106, advertisement servers 108 and many client devices 102. In some embodiments, there may be additional or fewer types of entities than are illustrated in FIG. 1. For example, a content delivery network (CDN) service provider or domain name service (DNS) provider may be included, or the intermediary system 104 may be omitted. In addition, each type of entity may include multiple independent or associated entities. For example, there may be many thousands or millions of client devices 102 and content providers 106, as well as thousands or more of advertising servers 108, advertisers 110, and intermediary systems 104.

The entities may communicate with each other via a communication network 112. The network 112 may be a publicly accessible network of linked networks, possibly operated by various distinct parties, such as the Internet. In other embodiments, the network 112 may include a private network, personal area network, local area network, wide area network, cable network, satellite network, cellular telephone network, etc. or combination thereof, each with access to and/or from the Internet.

The intermediary system 104 can be any computing system that serves as an intermediary between a client device 102 and a content server 106. For example, the intermediary system 104 can be an intelligent proxy server, an internet service provider (ISP), or some other device or group of devices that retrieve content on behalf of client devices 102. Illustratively, the intermediary system 104 of FIG. 1 is configured to serve as a proxy between client devices 102 and content providers 106. The intermediary system 104 can include a number of components, such as a content retrieval module 140, an advertisement retrieval module 142, an advertisement cache 144, an advertisement server 146, and a content rendering module, such as a remote browser 148. In some embodiments, the intermediary system 104 may include additional or fewer components than illustrated in FIG. 1. For example, the intermediary system 104 may not include a remote browser 148 or advertisement server 146. Additionally, the intermediary system 104 may be associated with various additional computing resources, such as CDNs, DNSs, and the like.

The intermediary system 104 may include multiple computing devices, such as computer servers, logically or physically grouped together. For example, the intermediary system 104 may include a number of data centers or point-of-presence (POP) locations, each of which include thousands of individual computing devices that collectively perform the functions of the intermediary system 104. Each POP may be located close to a concentration of users or potential users. A single POP of the intermediary system 104 provides computing services to any number of client devices 102. The components of the intermediary system 104, including the content retrieval module 140, advertisement retrieval module 142, advertisement cache 144, advertisement server 146, and remote browser 148 can each be implemented as hardware, such as a server computing device, or as a combination of hardware and software. In addition, the components of the intermediary system 104 can be combined on one server computing device or separated individually or into groups on several server computing devices. In some embodiments, the intermediary system 104 can include multiple instances of a single component, etc. In some embodiments, the functions of the intermediary system 104 may be performed by one or more components of a client device 102, such as hardware components or a combination of hardware and software components coupled to or integrated with the client device 102.

The client device 102 can correspond to a wide variety of computing devices, including personal computing devices, laptop computing devices, hand-held computing devices, terminal computing devices, mobile devices (e.g., mobile phones, tablet computing devices, etc.), wireless devices, electronic readers, media players, and various other electronic devices and appliances. The client device 102 generally includes hardware and software components for establishing communications over the communication network 112 and interacting with other network entities to send and receive content and other information. As shown in FIG. 1, a client device 102 can include a number of different components, including a browser application 120, an advertisement cache 122, and an impression queue 124. The client device 102 can include more or fewer components than those illustrated in FIG. 1. For example, the client device 102 can include a computer-readable medium drive, such as a hard drive, which contains software program instructions that, when loaded into a memory and executed by a processor, perform the functions of a browser 120, advertisement cache 122, and impression queue 124. In some embodiments, the client device 102 may not include an advertisement cache 122 or an impression queue 124.

The content server 106 illustrated in FIG. 1 can correspond to a logical association of one or more computing devices for hosting content and servicing requests for the hosted content over the network 112. For example, the content server 106 can include a web server component corresponding to one or more server computing devices for obtaining and processing requests for content (such as content pages) from the client device 102, the intermediary system 104, or other devices or service providers. In some embodiments, one or more content providers 106 may be a CDN service provider, an application service provider, etc.

The advertisement server 108 illustrated in FIG. 1 can also correspond to a logical association of one or more computing devices, including web servers, database servers, and the like. The advertisement server 108 hosts advertisements, services requests for the hosted advertisements, and records data about the advertisement requests. The advertisements may be images, videos, animations, audio recordings, applets, documents, or any type of file. The advertiser 110 illustrated in FIG. 1 can be any entity that purchases or otherwise requests inventory on which to display advertisements. For example, the advertiser 110 can correspond to a logical association of one or more computing devices for proving products or services to advertise.

In one illustrative embodiment, a user of a client device 102 can use a browser 120 to request a network resource, such as a content page. As described herein, the request can be transmitted, over the network 112, to an intermediary system 104 instead of directly to a content server 106. The request can be transmitted directly or otherwise routed to the content retrieval module 140 of the intermediary system 104 or some other component thereof. The content retrieval module 140 can request and receive the requested content from the content server 106. The retrieved content can be processed by the remote browser 148 prior to transmitting it to the client device 102. For example, the remote browser 148 can parse and render hypertext markup language (HTML) files and other resources associated with content pages, and then return a processed version of the content page, such as the document object model (DOM), to the requesting client device 102. Example systems for the retrieval and processing of content by an intermediary system are described in U.S. patent application Ser. No. 13/174,589, filed Jun. 30, 2010, and entitled "Remote Browsing Session Management," the contents of which are hereby incorporated by reference for all they disclose.

While processing the content, the remote browser 148 may encounter embedded references to advertisements, such as videos, images, executable scripts, and other content objects. The browser 148 can employ the advertisement retrieval module 142 to retrieve the referenced advertisement from the advertisement server 108 corresponding to the advertisement. The advertisement retrieval module 142 may be a component of the remote browser 148 or a separate component of the intermediary system 104. In some embodiments, the remote browser 148 may retrieve advertisements without aid of an advertisement retrieval module 142. In response to retrieving and processing the requested content and associated objects, including advertisements, the resulting processed content can be transmitted to the client device 102 for display in the browser 120.

The retrieval of advertisements embedded in or otherwise associated with a content page can negatively affect the processing time and overall performance of a content page. In a typical example, the embedded reference in a content page is an HTML object, such as an iFrame, that provides a window that may be used to load and display content from domains unrelated to the content server 106. The iFrame is used to load and display content from an advertisement server 108 in a content page from a content server 106. The iFrame may not be fully processed and rendered until after the rest of the content page, causing a performance loss that is perceived by the user as being solely or primarily attributable to advertising. To avoid such a performance loss, advertisements may be cached before they are required. The advertisements may then be loaded from the cache instead of initiating separate requests for the advertisements from the advertising server 108 during or after processing of the content page in which the advertisement is to be displayed.

In parallel with the content processing at the intermediary system 104, or at a time prior to or subsequent to processing the requested content, the advertisement retrieval module 142 can retrieve advertisements which may be used to satisfy future embedded references to advertisements. For example, a content server 106 may typically be associated with a single or small number of advertisement servers 108. Therefore, the advertisement retrieval module 142, in anticipation of further requests for content from the same content server 106, can retrieve from the associated advertisement servers 108 a set of advertisements which are appropriate to display or are likely to be displayed on subsequently requested content. The advertisements can be stored in an advertisement cache 144 associated with the intermediary system 104.

The client device 102 may also cache advertisements. For example, if the client device 102 requests content directly from a content server 106 instead of using an intermediary system 104, then the client device 102 may also prefetch advertisements from an advertisement server 108 and store the advertisements in an advertisement cache 122. Alternatively, the client device 102 may receive the advertisements from the intermediary system 104 for implementations in which the client device 102 transmits content requests to the intermediary system 104.

Client devices 102 may be associated with any number of connections to the network 112. For example, a desktop computer may be capable of wired and WiFi connections to the network 112. Similarly, a mobile phone or tablet may be capable of WiFi, Bluetooth, and 3G/4G connections. When advertisements are cached on the client device 102 instead of or in addition to the intermediary system 104, it may be desirable prefetch the advertisements when the client device 102 has a specific type of connection to the network 112 (e.g., a WiFi connection in the case of mobile phones), and not desirable when the client device 102 has other types of connections to the network 112. Due to the potentially large amount of advertisement data that may be prefetched, the client device 102 may be configured to prefetch advertisements only when the client device 102 has a high speed connection. Alternatively, the client device 102 may be configured to suspend the prefetching of advertisements when the connection is one in which the user is charged per unit of data received, or if there is a cap on the number of units of data a user may receive. The client device 102 or some component thereof may implement a learning process to determine how often the client device 102 has an active network connection that may be used to prefetch advertisements. Thereafter, when the client device 102 establishes a connection over which advertisements may be prefetched, the client device 102 may prefetch enough advertisements to last until the next time the client device 102 establishes the connection.

In another illustrative embodiment, a user of a client device 102 may be provided with a mechanism to bookmark, save, or otherwise tag advertisements of interest. For example, if a user is browsing previously retrieved data offline, the user may encounter an advertisement of interest. The user may tag the advertisement and then revisit the advertisement (to access the associated network-accessible site or content) when a network connection is available. The tagging feature may also be available when the client device 102 does have a network connection, but the user wishes to tag advertisements of interest for later viewing anyway. Alternatively, content pages of information associated with the advertisement may be cached along with the advertisement itself, and a user may be able to click, select, or otherwise activate the advertisement and view the associated content page of information about the advertisement even in the absence of a network connection.

In a further illustrative embodiment, advertisements from the advertisement cache 122 may be displayed when a user of a client device 102 is browsing content offline and a content page references an advertisement that is not available for offline viewing. Alternatively, advertisements from the advertisement cache 122 of the client device 102 or the advertisement cache 144 of the intermediary system 104 may be substituted for advertisements referenced by a content page while a client device 102 has an active network connection. For example, the intermediary system 104 may include an advertisement server 146. The intermediary system 104 may submit a bid to the third party advertisement server 108 in addition to a request for an advertisement referenced in a content page. If the third party advertisement server 108 accepts the bid, such as when the bid is for an amount greater than what the third party advertisement server 108 will receive from an advertiser 110 for serving an advertisement, then the advertisement server 146 of the intermediary system 104 can substitute its own advertisement into the content page that is delivered to the requesting client device 102, or another advertisement from one of the advertisement caches 122, 144 may be substituted.

Advertisement Caching

Figure 2A:
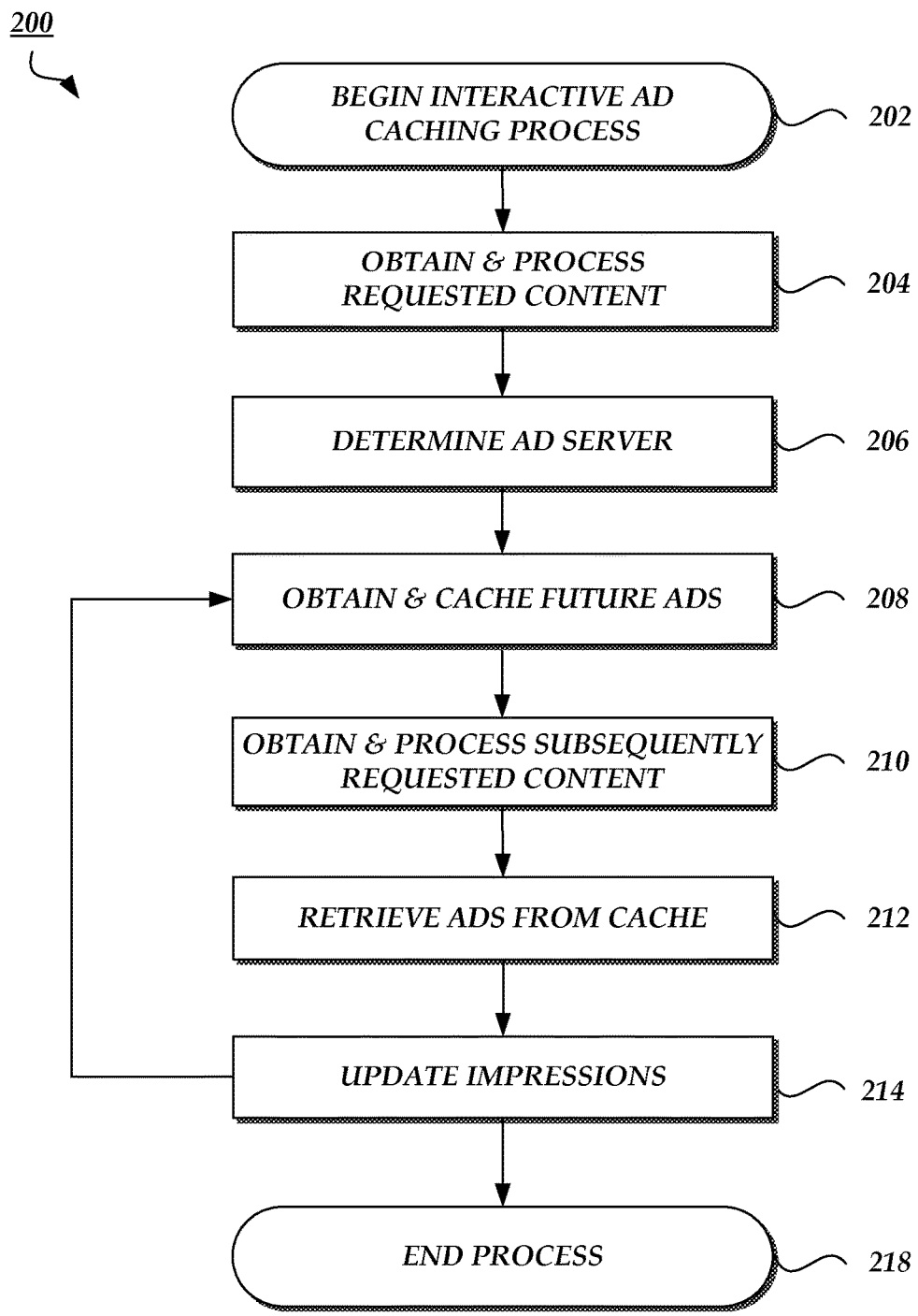
FIG. 2A is a flow diagram of an illustrative process for interactive advertisement caching.

FIG. 2A is a flow chart of an illustrative process 200 for interactive caching of advertisements. The process begins at block 202, and may be executed by a client device 102 or an intermediary system 104. In either case, the entity determines which advertisement servers 108 to retrieve advertisements from for future use based on a previous request for a content page.

At block 204, a request for a content page is made. For example, a user of a client device 102 may initiate a request for a content page by launching a browser 120 and entering a uniform resource locator (URL), such as http://www.xyz-website.com/. The browser 120 or some other component of the client device 102 may utilize DNS lookups to determine the internet protocol (IP) address of the content server 106 corresponding to the URL. The browser 120 can then contact the content server 106 and request the content page. In the present example, the content server 106 responds by transmitting an HTML file corresponding to a default content page. FIG. 2B illustrates a code sample 250 defining an HTML file that may be returned in response to a request for a content page. The HTML file may contain a number of embedded references to network resources and other objects, such as advertisements. Code sample 260 is one example of code that may included in the HTML file defined by code sample 250. Code sample 260 includes a reference to an advertisement hosted by the advertisement server 108 at http://ads.adnetwork.com/, as seen in portion 262. The browser 120 can process the HTML file, requesting and retrieving all objects corresponding to embedded references, including an advertisement from the advertisement server 108 at http://ads.adnetwork.com/.

At block 206, the browser 120 may determine that future requests for content from the same content server 106 are likely to include references to advertisements hosted by the advertisement server 108 at http://ads.adnetwork.com/. The determination may be made based solely on the HTML file retrieved in response to the request. Alternatively the determination may be based on other factors, including historical requests for content from the content server 106 or from content providers 106 in general. For example, the advertisement server 108 at http://ads.adnetwork.com/ may have a substantial overall market share among content providers 106 hosting this type of content.

At block 208, the browser 120 can contact the advertisement server 108 and prefetch a number of advertisements for storage in the advertisement cache 122 in order to improve the performance of future requests. The advertisement server 108 may provide a mechanism, such as an application programming interface (API), for prefetching advertisements. By exposing a prefetch API, the advertisement server 108 can ensure that it does not prematurely record advertisement impressions in response to the prefetching operations. For example, the browser 120 (or the intermediary system 104) can contact the advertisement server 108 and request a number of advertisements for caching. The request can include information about recent browse history of the client device 102, such as the most recent page requested by the client device 102. The advertisement server 108 can use such recent browse history to determine which advertisements it would likely serve to the client device 102 next. The advertisement server 108 can then transmit one or more advertisements to the client device 102 (or intermediary system 104) for caching and future display. In some embodiments, the browser 120 may alternatively submit a number of requests for advertisements without utilizing a prefetch API.

At block 210, the user submits a subsequent request for content. The browser 120 retrieves the content page from the content server 106 and processes it, retrieving objects corresponding to embedded references within the content page. Advertisements, however, are not necessarily retrieved from their corresponding advertisement server 110.

At block 212, content requests processed after advertisements have been cached may have advertisement references satisfied from the cache 122. Returning to the example above, if the browser 120 encounters an embedded reference to an advertisement hosted by http://ads.adnetwork.com/, the browser 120 may retrieve the advertisement from the cache 122 rather than from the advertisement server 108. In some cases, advertisements may be served based on any number of factors, including the specific client device 102, user, or content page. The advertisements may be associated with properties reflective of such factors, and the properties may be present within the embedded reference. In some embodiments, only cached advertisements corresponding to such properties will be displayed; if there are no advertisements in the cache 122 that are associated with the specific properties of the embedded reference, the advertisements will be retrieved from the advertisement server 108.

Advertisement servers 108 may implement any of a number of different techniques for determining the number of times an advertisement has been displayed on a client device 102. Each display of an advertisement is known as an impression. In a typical case, advertisers 110 pay for each impression of their advertisement, or for a number of impressions. Advertisers 110 also commonly pay for each time their advertisement is clicked. Content providers receive payment for each impression or number of impressions, or for each time a user clicks an advertisement displayed on content from the content provider. The impression count is maintained by the advertisement server 108 (and may also be maintained by each advertiser 110 and/or content server 106). One way that the advertisement server 108 counts impressions is by tracking the number of times an advertisement is downloaded. Alternatively, the advertisement servers 108 may track impression counts by receiving a notification from the advertisement itself, or from code associated with the advertisement, in response to the display of the advertisement on a client device 102.

To preserve the accuracy of any impression counts maintained by the advertisement server 108, the browser 120 may submit data to the advertisement server 108 indicating that the prefetched advertisements are not being displayed currently, but rather are being cached for future display. Later, when or after an advertisement is displayed, the browser 120 can notify the advertisement server 108 of the impression at block 214. If the advertisement server 108 tracks impression counts by receiving a notification from the advertisement upon display, the browser 120 can ensure that the notification is triggered at block 214 when and only when the advertisement is displayed. In some embodiments, data regarding advertisement impressions is collected by the intermediary system 104. The intermediary system 104 may contact the advertisement server 108, for example via an API, in order to notify the advertisement server 108 of impressions for advertisements retrieved by the intermediary system 104 or associated client device 102. In some embodiments, the advertisement server 108 may contact the intermediary system 104 to determine a correct impression count for advertisements retrieved by the intermediary system 104 or associated client device 102.

FIG. 2B illustrates an example of a notification triggered from the advertisement upon display. Line 54 of code sample 260 is an HTML image tag that causes the browser to retrieve an image hosted by the advertisement server 108 at http://ads.adnetwork.com/, which is the advertisement server 108 hosting the advertisement referenced in line 51. The advertisement server 108 may embed an identifier 266 within the image tag on line 54. The identifier 266 can correspond uniquely to the particular advertisement reference in line 51, and thus enables the advertisement server 108 to determine which advertisement was viewed. The image is typically only 1 pixel by 1 pixel and thus effectively invisible to the user. When the 1 pixel image referenced in line 54 is retrieved, the advertisement server 108 can increment the impression count. By determining how an advertisement server 108 implements such notification schemes, the browser 120 can simulate the notifications for advertisements that are retrieved from the advertisement cache 122 and displayed on a content page at a variable time after the advertisement is originally retrieved from the advertisement server 108. For example, the browser 120 or some other component of the client device 102 (or of an intermediary system 104) can have access to a repository of impression notification definitions. The repository can specify, for each advertisement server 108 or other advertising entity, how impressions for various advertisements are constructed and executed. The browser 120 can then use the definitions to construct its own impression notifications for cached advertisements, such as creating the requests for 1 pixel tracking images.

The process 200 can then return to block 208 to retrieve additional advertisements, for example if the cache 122 has been or may soon be exhausted, or to replace any advertisement displayed in block 212.

In some embodiments, the process 200 is implemented by an intermediary system 104. For example, content retrieval module 140 or remote browser 148 may retrieve and process content from the content server 106 in response to a request from a client device 102. The advertisement retrieval module 142 can determine which advertisement server or servers 108 host the advertisements for content from the content server 106. The advertisement retrieval module 142 can then prefetch advertisements into the advertisement cache 144, similar to the operation of the client device 102 described above. One advantage of caching advertisements at the intermediary system 104 is that potentially a much larger number of advertisements may be cached, due to the larger storage capacity of the server computing devices and data centers which may form the intermediary system 104. In some embodiments the intermediary system 104 can service requests from thousands or millions of client devices 102. In such cases, a robust shared advertisement cache 144 may be maintained for any or all of the known advertisement servers 108. The intermediary system 104 may distribute a single cached advertisement to many different client devices 102.

The intermediary system 104 can consider characteristics of the client device 102 when selecting advertisements to deliver to the client device 102. The intermediary system 104 may select advertisements based the connection speed or type currently available to the client device 102 (e.g., textual advertisements may be preferred over graphical advertisements when connection speed is slow), or the form factor or type of the client device 102 (e.g., the intermediary system 104 could refrain from delivering to a mobile phone advertisements that are deemed poorly suited for small form factor devices). The intermediary system 104 may also consider user characteristics, such as a user's browsing history across many sites and which types of advertisements, if any, the user has selected.

Figure 3:
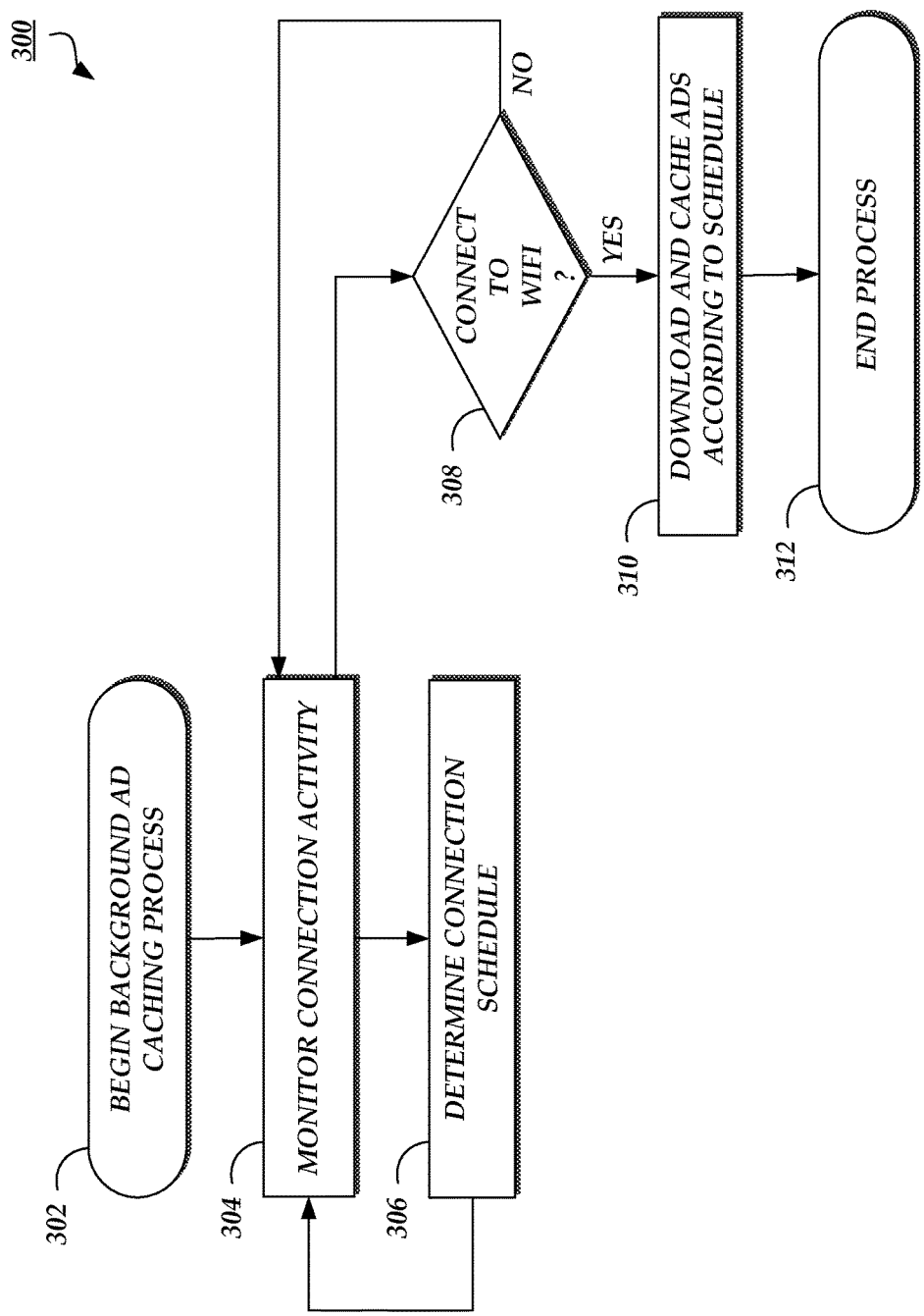
FIG. 3 is a flow diagram of an illustrative background advertisement caching process.

FIG. 3 is a flow chart of an illustrative process 300 for background caching of advertisements. The process 300 can be utilized by a client device 102 in order to conserve resources while still realizing the benefits of cached advertisements. Advertisements may include large files to be retrieved from the advertisement server 108, and a larger number of cached advertisements may be used in order to fill the inventory on a given content page. Therefore, a large advertisement cache 122 may be desirable. Retrieving advertisements to stock a large advertisement cache 122 may consume substantial network connection bandwidth. Client devices 102 may be associated with multiple network connections, and each connection may have its own performance characteristics and costs. For example, a mobile phone may be able to connect to WiFi networks when available, and transfer an unlimited amount of data at no additional cost beyond the subscription to the ISP with which the WiFi network connects. The majority of the time, however, the mobile phone may be connected to slower mobile networks such as 3G/4G. Users may be charged per unit for each unit of data transferred to or from their mobile device over such mobile networks, such as $0.20 per MB. In addition, mobile networks may have a cap on the number of data units that may be transmitted to or from the client device 102 in a given period of time, such as 2 GB per month. In such cases, retrieving large advertisement files, or a large number of advertisements, from an advertisement server 108 before the advertisements are required may be best executed during the time that the mobile phone is connected to a WiFi network.

The process 300 begins at block 302. The process 300 may be a service which begins execution when the client device 300 powers on, or it may be launched on a schedule or on demand by the user.

At block 304 the process 300 monitors the connection activity and status of the client device 102. For example, the process 300 may record data regarding how often the client device 102 establishes a connection to a network 112, the bandwidth available for each network connection, the length of time the client device 102 is connected, the amount of data that is transferred to and from the client device 102, and the like.

At block 306 the process 300 can utilize the data recorded during the monitoring described with respect to block 304 in order to determine a connection schedule. In one example, the process 300 may recognize a pattern wherein the client device 102 has a WiFi connection available overnight, and relatively little activity occurs during that time. During daytime hours, the client device 102 may be connected primarily to mobile networks such as 3G/4G. The client device 102 may utilize the mobile network connections extensively, requesting many content pages. In such a case, the process 300 may determine that the client device 102 should replenish the advertisement cache 122 at night, when the client device 102 is connected to a high speed, low cost WiFi network and the client device 102 is not in use. The operations of blocks 304 and 306 may occur continuously and in parallel throughout the lifetime of the process 300. Alternatively, the operations of block 306 may occur only as scheduled or on demand.

Returning to block 302, in addition to monitoring the connection activity of the client device 102 in an effort to gather information for the operations of block 306, the process 300 also monitors the connection activity in order to initiate the retrieval of advertisements for the advertisement cache 122. At decision block 308, the process 300 detects whether the client device 102 has established the connection that it uses to retrieve advertisements for the advertisement cache, as determined at block 306. In addition, the process 300 determines whether the scheduled time for cache replenishment has arrived. If the proper connection has been established and the current time satisfies the schedule as determined in block 306, the process proceeds to block 310. At block 310, the process 300 initiates retrieval of advertisements from one or more advertisement servers 108. The advertisements are stored in the advertisement cache 122. Upon completion of the advertisement caching operation, the process may terminate at block 312, or proceed to monitor the connection activity of the client device 102 at block 304.

Advertisement Tagging and Offline Browsing

FIG. 4A is a flow diagram of an illustrative process 400 for tagging advertisements so that a user may return to them, and click through to associated content, at a later time. The process 400 may be embodied the executable code of a browser 120 or some other application of a mobile client device 102, such as a mobile phone or tablet. Some mobile applications automatically retrieve and store network content, including content with advertisements, for later (offline) browsing. In some embodiments, the browser of a mobile client device 102 may be configurable by the user to preemptively retrieve and locally cache certain content pages or entire web sites to enable them to later be browsed offline. In some embodiments, the process 400 can be embodied in browsers 120 or applications of other types of client devices 102, such as desktop computers.

The process 400 may be executed when the client device 102 is offline, such as when a user is browsing previously retrieved content. In such a case, if the user encounters an advertisement and wishes to receive more information, the user may tag the advertisement. The user may then return to the tagged advertisement at a later time, such as when network connectivity has been restored. Alternatively, an information page may have been cached, and the user may view the information page associated with the advertisement even if the client device 102 is offline. The process 400 may also be executed when the client device 102 is online. For example, if a user is browsing content and sees an advertisement of interest, the user may tag the advertisement so that the user can continue browsing online. At a later time, the user may return to the tagged advertisement to get more information.

The process 400 begins at block 402. At block 404, a content page with an advertisement may be displayed. If the client device 102 has an active network connection, the content page and advertisement may have been retrieved directly from a content server 106 and advertisement server 108, without use of a local cache. Alternatively, the advertisement may have been previously cached, and is loaded from the cache 122 for display. If the client device 102 offline, then the advertisement is a cached advertisement, and an impression notification for the advertisement is queued at block 406. The client device 102 may have an impression queue 124 for queuing impression notifications associated with advertisements which have been cached and viewed offline. For example, the 1 pixel image reference associated with the advertisement, described above, may be placed in the impression queue 124. In response to network connectivity being restored, the impression notification can be executed, such as by requesting the 1 pixel image from the advertisement server 108 or otherwise transmitting the image reference to the advertising server 108.

Figure 4B:
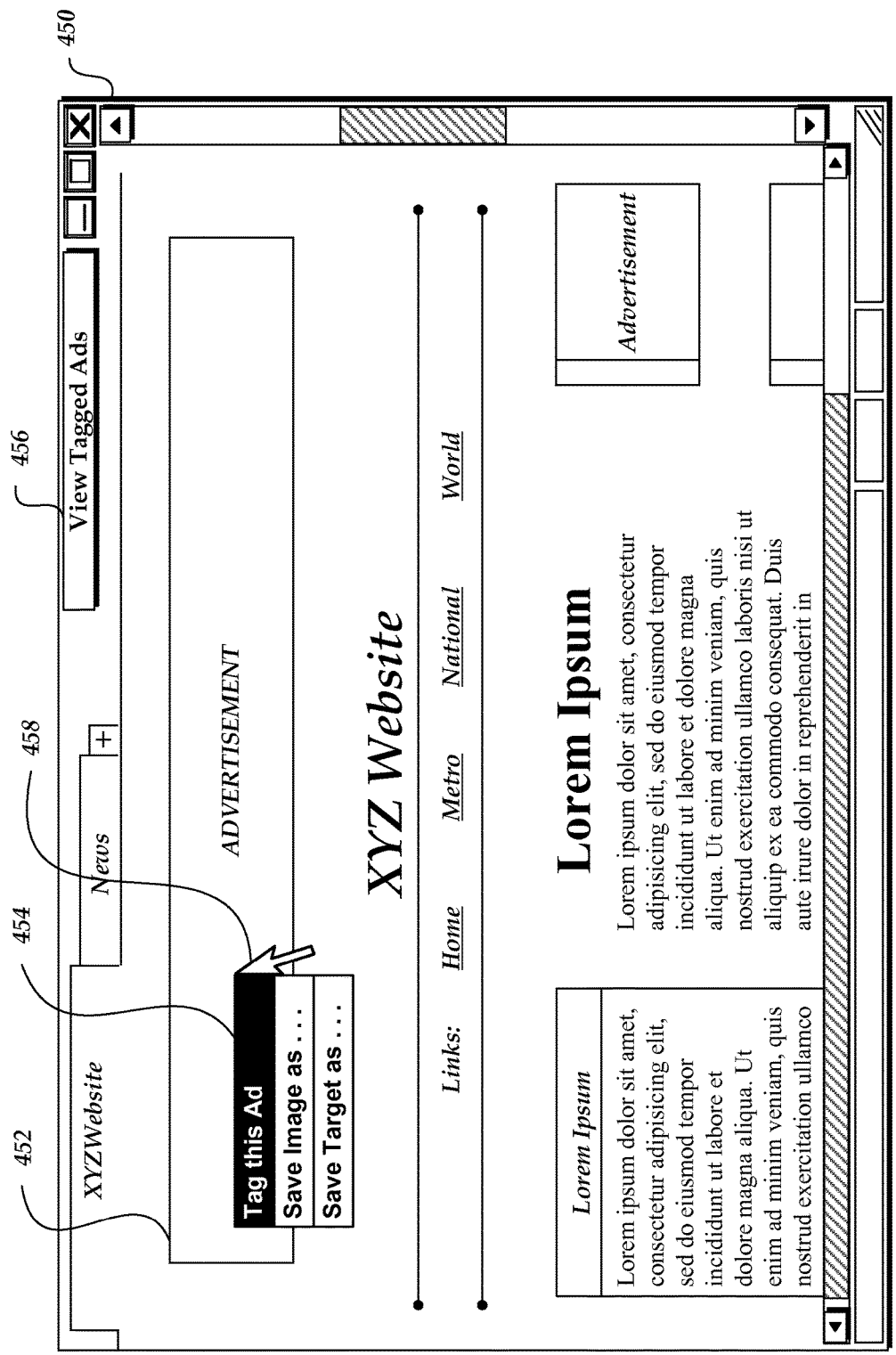
FIG. 4B is a user interface diagram depicting an illustrative browser interface displaying an advertisement.

At decision block 408, the user may tag an advertisement displayed on the content page. FIG. 4B illustrates an example browser interface 450 displaying a content page with an advertisement 452. A user may position the cursor 458 over the advertisement and activate a command menu 454, such as by tapping on the advertisement 452. If the client device 102 does not have an active network connection, the command menu 454 may display to give the user the option to tag the advertisement 452. In some embodiments, the command menu 454 can be displayed each time the user taps on the advertisement 452, even if the client device 102 does have an active network connection. In some embodiments, the user may use a mouse click, keyboard command, voice command, touch screen gesture, or some other input to activate the command menu 454. The command menu 454 may include various options to perform on the advertisement or the content page. One option may be to tag the advertisement displayed at the location of the cursor 458. In some embodiments, no command menu 454 is displayed. Rather, a single input operation such as a mouse click or touch screen gesture initiates tagging of the advertisement.

Upon activation of the tag option, the advertisement displayed at the location of the cursor 458 can be tagged at block 410. Tagging an advertisement may cause the browser 120 create or modify a file that indicates the target address to which the browser 120 would navigate if the advertisement were activated. For example, a temporary bookmark may be created in a storage area on the client device 102, such as a storage area or file maintained by the browser 120.

At decision block 412, the user may select, click, or otherwise activate an advertisement, for example to navigate to the target content page associated with the advertisement. At block 414, the target page is displayed on the client device 102. If the client device 102 is online, the target page may be retrieved from the advertisement server 108, a content server 106, or the advertiser 110. Alternatively, the target page may have been cached with the advertisement, and therefore the target page may be retrieved from the cache 122. If the client device 102 is offline, the target page will be retrieved from the cache 122. In some cases, the target page may also be associated with an impression notification. In such cases, the notification can be queued in the impression queue 124 for submission when network connectivity is restored. In some embodiments, caching of target pages may be implemented predicatively. For example, a component of the browser 120 can track how often a user taps, clicks or otherwise selects advertisements. If the number of percentage of times a user does so exceeds a threshold, target pages can be cached; otherwise, caching of target pages may be minimized or not implemented.

At decision block 416, network connectivity may be restored if the client device 102 was operating offline. In response, any impression notifications in the impression queue 124 may be submitted to the associated advertisement server 108. Additionally, the advertisement tags may be submitted. For example, the intermediary system 104 may store advertisement tags for a user of multiple client devices 102. By storing the advertisement tags at the intermediary system 104, the user may be able to access them from any client device 102 regardless of which client device 102 they were initially created on. In another example, the advertisement tags may be submitted to the intermediary system 104, a content server 106, or some other entity which compiles advertisement tags from a number of different client devices 102. A content server 106 may publish a list of which advertisements have generated the most interest among users based in part on the submitted tagging operations.

In some embodiments, the process 400 may determine whether a specific type of network connection has been established prior to transmitting impression notifications queued in the impression queue 124, as described above with respect to FIG. 3. In some embodiments, the process 400 may replenish the cache 122 in response to detecting an active network connection or a specific type of network connection as also described above with respect to FIG. 3. For example, some of the advertisements and landing pages displayed while the client device 102 was offline may only be displayed once. As a result, the available stock in the cache 122 has been reduced, and the browser 120 or some other component of the client 102 may replenish the cache 122 so that the benefits of cached advertisements may continue to be available.

Figure 4C:
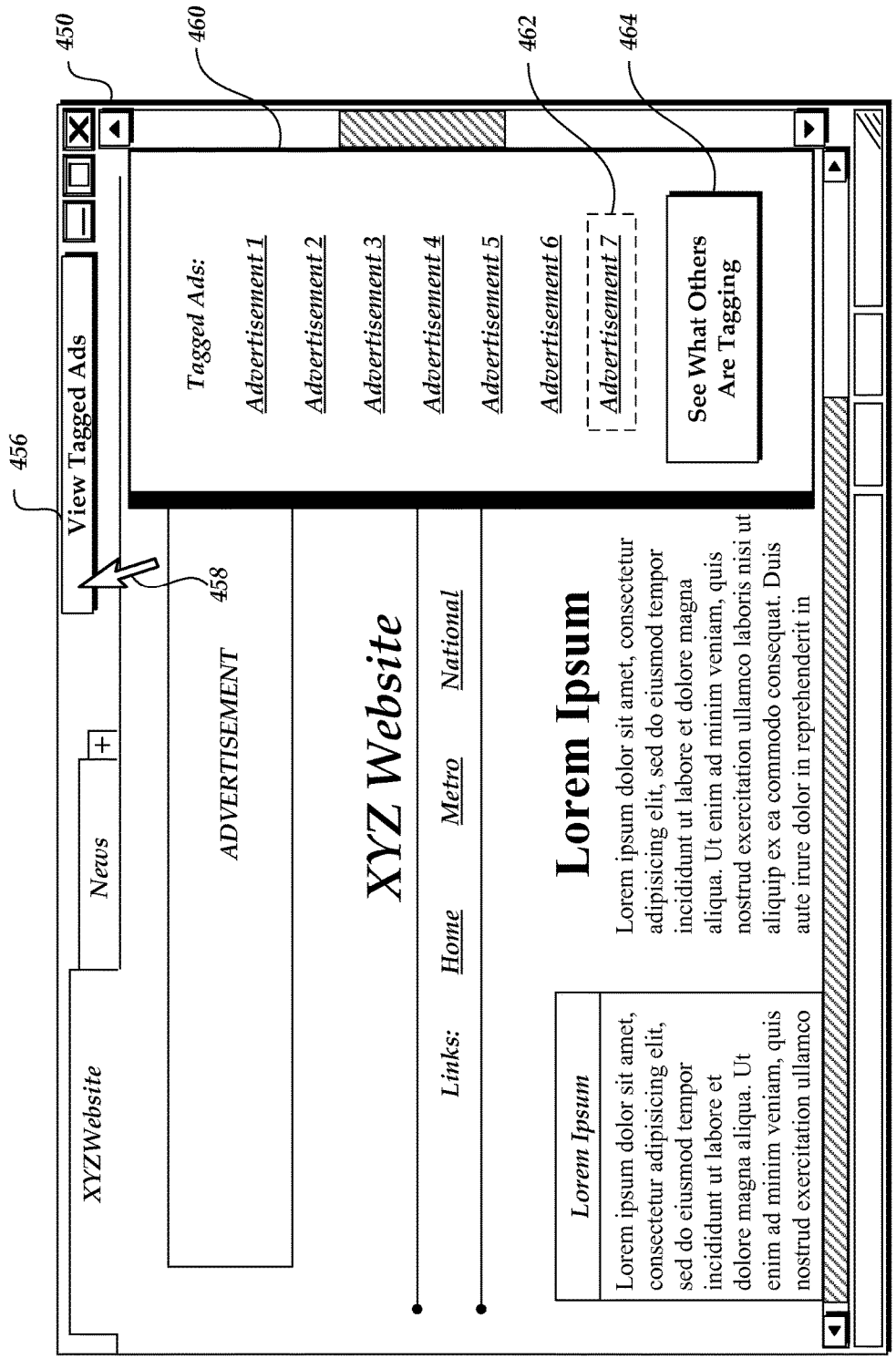
FIG. 4C is a user interface diagram depicting an illustrative browser interface displaying a listing of tagged advertisements.

FIG. 4C illustrates a browser interface 450 with a listing 460 of tagged advertisements. A user may display the listing 460 by activating a browser control, such as a command button 456. Alternatively, the listing 460 may be displayed in response to a keyboard command, menu selection, touch screen gesture, and the like. The tags in the listing 460 may be presented in a number of different ways, including as links to the target page associated with the tagged advertisement. For example, link 462 has been included in the tag listing 460 in response to a previously executed advertisement tagging operation. If a user were to select, click, or otherwise activate the link 462, the browser 120 would navigate to the target page associated with the advertisement. In some embodiments, activating a link also removes the link from the tag listing 460. In such cases, the tags act as temporary bookmarks, providing a user with convenient access to a content page which is likely to be accessed only once. In addition, a command button 464 or other interactive control may be provided for accessing the listing of advertisements which other users have tagged or otherwise found interesting. Activating the command button 464 can cause the browser 120 to navigate to a content provider maintaining or providing such information.

Replacement and Exchange of Advertisements

Figure 5:
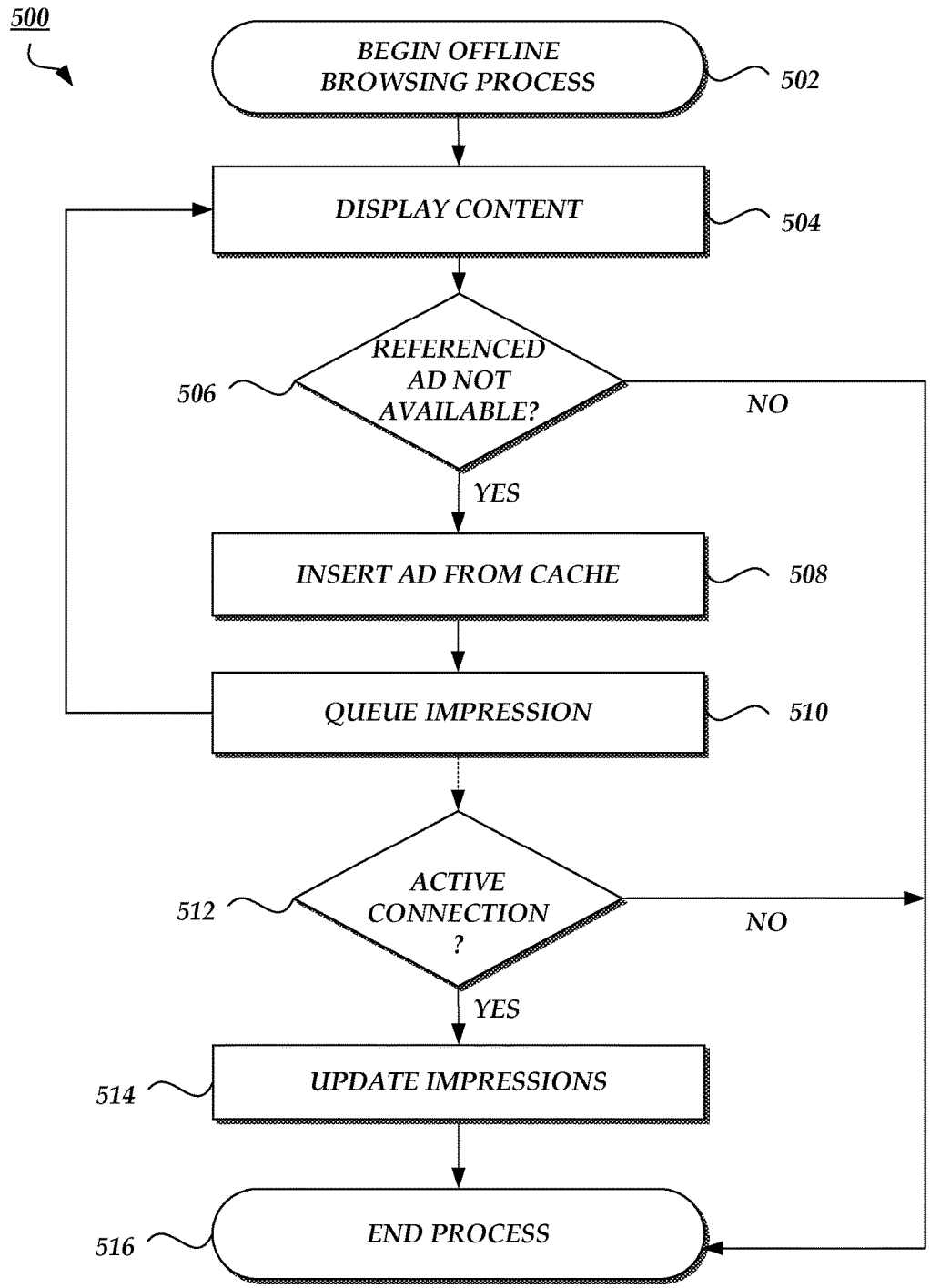
FIG. 5 is a flow diagram of an illustrative process for offline browsing and advertisement substitution.

FIG. 5 is a flow diagram of an illustrative process 500 for substituting a cached advertisement in place of an advertisement that is unavailable when the content page with which the advertisement is associated is displayed. In some embodiments, the process 500 may implemented by a browser 120 of a mobile client device 102, such as a mobile phone or a tablet. The process 500 can execute when the client device 102 is offline, such as when a user is browsing previously retrieved content. In such a case, if the browser 120 encounters an embedded reference to a specific advertisement that has not been previously retrieved, the browser 120 may substitute an advertisement from the cache 122. The process 500 may also be executed when the client device 102 is online, such as when a content page is retrieved and processed for display, but there is no response from the advertisement server 108 to a request for an advertisement to display on the content page. The browser 120 may retrieve for display an advertisement from the cache 122, or from an advertisement server 146 associated with the intermediary system 104, rather than display the content page with unused inventory, such as a large blank space or error message.

The process 500 begins at block 502. At block 504, content is processed and displayed by the browser 120. The content may be a newly requested content page if the client device 102 has an active network connection or a previously retrieved page if a user is browsing offline. As described above, the content may be defined by an HTML document that contains one or more embedded references to advertisements. FIG. 2B illustrates an example of such an HTML page.

At decision block 506, the process 500 determines whether any referenced advertisement is not available. If an advertisement is not available, the process 500 proceeds to block 510. Otherwise, the process ends and the browser can display the advertisements.

An advertisement may not be available when the browser 120 has requested an advertisement from the advertisement server 108 and has not received a response. In some cases, an advertisement may not be available when a user is browsing offline, even though advertisement originally referenced by the HTML file defining the content page was retrieved and stored for offline viewing. Code sample 250 of FIG. 2B illustrates a programming script on lines 4-6 that may be executed by the browser 120 when the HTML file is processed. The JavaScript code on line 5 assigns a large random number to the "random_cashbust_number" variable. This number may be appended onto a URL that is used to request an advertisement. Code sample 260 illustrates, on line 51 and specifically at portion 264, how such a URL may look after the random number stored in the "random_cashbust_number" variable has been appended onto a URL. Note that the portion 264 displaying the large random number may not typically be hard coded into the HTML file, but rather is appended during execution. In some cases, all or substantially all of the code to retrieve an advertisement is generated dynamically and does not literally appear in a textual HTML file. The code samples 260 and 270 are merely illustrative of how such a URL would change in practice from one execution to another.

Code sample 270 illustrates, on line 51 and specifically at portion 272, how the same URL might be formed during a subsequent execution of the code within the HTML file. Note that the large random number appended to the end of the URL, highlighted in portion 272, is different than the large random number appended to the end of the URL in code sample 260 at portion 264. Otherwise, the URL is the same. Advertisement servers 108 may use such techniques to prevent display of the same advertisement each time the content page is viewed. For example, when a browser 120 or some other component of the client device 102 retrieves the HTML file that defines a content page and stores it for future offline display, the HTML file may be processed and advertisements corresponding to embedded references may be retrieved and stored as well. When a user subsequently views the page, the HTML file is loaded from local storage, such as a cache, and processed. During this second processing of the HTML file, the JavaScript at line 5 of code sample 250 is executed again, and a different random number is assigned to the variable and ultimately appended to the URL associated with the advertisement. Therefore, it will appear to the browser 120 that the advertisement associated with the URL is not present on the client device 102.

At block 508, the browser can load an advertisement from the local cache 122 and inert it into the content page at the location where the unavailable advertisement would be displayed. Typically, the browser 120 will select an advertisement of the same type and size as the unavailable advertisements. For example, if the unavailable advertisement is a 468 pixel by 60 pixel banner advertisement, then an advertisement of those same or similar characteristics, if available, can be selected from the cache 122 and displayed.

At block 510, the impression notification for the advertisement displayed in block 508 is queued if a network connection is not available at the time the advertisement is displayed. As described above, a command or notification may be placed in an impression queue 124 on the client device 102. The process 500 may then return to block 504 if a subsequent content page has been requested for viewing. Alternatively, if there are several unavailable advertisements associated with the current content page, the operations of blocks 506, 508, and 510 may be repeated as many times as necessary to fill all available advertising inventory associated with the content page.

At decision block 512, the process 500 determines whether, or is notified that, an active network connection has been established. If a connection is detected, the process 500 proceeds to block 514, where the impression notifications queued in the impression queue 124 are transmitted to the appropriate entities. In some embodiments, the process 500 may determine whether a specific type of network connection has been established prior to transmitting notification impressions, as described above with respect to FIG. 3. In some embodiments, the process may replenish the cache 122 in response to detecting an active network connection or a specific type of network connection as also described above with respect to FIG. 3. For example, some of the advertisements displayed while the client device 102 was offline may only be displayed once. As a result, the available stock in the cache 122 has been reduced, and the browser 120 or some other component of the client 102 may replenish the cache 122 so that the benefits of cached advertisements may continue to be available.

Figure 6:
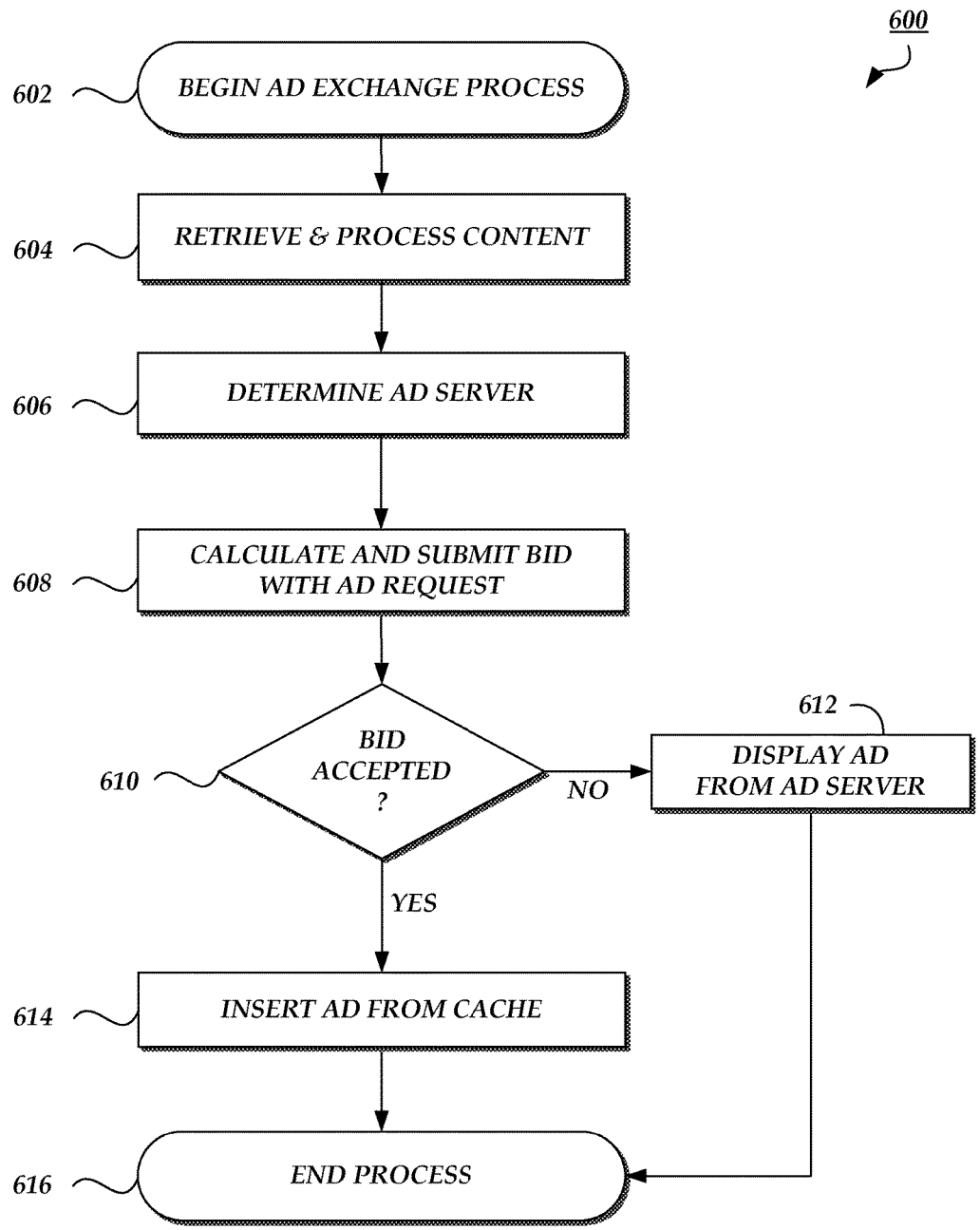
FIG. 6 is a flow diagram of an illustrative process for bidding on inventory and exchanging advertisements.

FIG. 6 is a flow diagram of an illustrative process 600 for substituting a cached advertisement, or an advertisement from an advertisement server 146 associated with the intermediary system 104, in place of an advertisement from a third party advertisement server 108. The substitution of an advertisement from a third party advertisement server 108 with an advertisement from the advertisement server 146 of the intermediary system 104 can be based on a determination that it is more profitable or otherwise more desirable for the advertisement server 146 to serve an advertisement than for the third party advertisement server 108 to do so. In such cases, the advertisement server 146 can purchase the inventory from the third party advertisement server 108 and serve an advertisement to the client device 102. (To enable such transactions, a system that hosts an inventory marketplace may be provided that enables participating ad server operators to buy and sell inventory through automated processes based on configurable parameters.) In similar fashion, the client device 102 may substitute an advertisement, such as an advertisement received from the advertisement server 146 associated with the intermediary system 104, for an advertisement from a third party advertisement server 108. For example, the client device 102 may have a relationship with or otherwise be associated with the intermediary system 104. As part of the relationship, the intermediary system 104 may be permitted to cache advertisements on the client device 102 for substitution, and in return the client device 102 can experience a performance gain due to the use of cached advertisements.

The process 600 begins at block 602. At block 604, the client device 102 retrieves and processes content from a content server 106. As described in detail above, the browser 120 of the client device may process the content and retrieve objects, such as images, video, and advertisements, associated with embedded references within the content.

At block 606, the browser 120 can determine which advertisement servers 108 are associated with any advertisements referenced in the content page. For example, the browser 120 may use the techniques described above with respect to FIGS. 2A and 2B to analyze an HTML file that defines the content page and extract a URL or other identifier associated with an advertisement.

At block 608, the browser 120 or some component thereof can calculate a bid to submit to the third party advertisement server 108. As described above, the client device 102 may be associated with an intermediary system 104. For example, the client device 102 may receive services from the intermediary system 104, such as internet service, proxy services, and the like. The intermediary system 104 may also be permitted to cache advertisements from its own advertisement server 146 into the advertisement cache 122 of the client device 102 as part of those services. When a browser 120 requests a content page, the browser 120 may then calculate the value of inventory associated with the content page. The value may be determined from the perspective of the advertisement server 146 of the intermediary system 104. For example, the advertisement server 146 may be associated with any number of advertisers 110, and may provide targeted delivery of advertisements from the advertisers 110 to client devices 102 associated with the intermediary system 104. The advertisement server 146 may be able to provide such targeted advertisement delivery due to its relationship with the client devices 102. The advertisement server 146 may have access to various information about the client devices 102 or users of the client devices 102, and the advertisement server 146 may use that information to determine more effective placement for advertisements. Such targeted placement of advertisements may be worth an additional expense from the point of view of the advertisers 110.

In one example, the advertisement server 146 may be able to sell inventory on the content page to an advertiser for $0.15. The bid for the inventory that the browser 120 will submit to the third party advertisement server 108 may then be calculated to be $0.12, providing the advertisement server 146 a $0.03 profit. The amount of the bid need not be based entirely on profit. In practice, the bid may be based on any one reason or combination of reasons. The browser 120 can append a parameter onto the end of the query string of the URL that is used to request the advertisement from the advertisement server 108. The parameter can be a predefined parameter that the advertisement server 108 is configured to recognize and process. If such a bid is submitted to advertisement server 108 which does not recognize the bid parameter, the parameter may be ignored and the advertisement request process as normal. In some embodiments, alternative methods of submitting a bid to a third party advertisement server 108 may be used. For example, an API may be used to communicate bids and the acceptance or reject of those bids.

At decision block 610 the process 600 determines whether the third party advertisement server 108 has accepted the bid. In some embodiments, acceptance of the bid is indicated in the response from the third party advertisement server 108, such as by transmitting a notification. For example, if the third party advertisement server 108 determines that it would be able to sell the inventory on the content page to an advertiser for $0.10, the bid of $0.12 from the intermediary system 104 advertisement server 146, via the browser 120, represents an additional revenue of $0.02 for the third party advertisement server 108. In such a case the third party advertisement server 108 can accept the bid and send a notification to the browser 120. The third party advertisement server 108 need not have any particular reason to accept the bid. In practice, the bid may be accepted for any reason, not limited to bid amounts and profit. The process can then proceed to block 614, where the browser inserts an advertisement from the advertisement cache 122 at the location of the content page where the advertisement from the third party advertisement server 108 would have been displayed. As described above with respect to FIG. 5, the advertisement to display on the content page may be selected based on a similarity in size and type with the advertisement that it is to replace.

Returning to decision block 608, the third party advertisement server 108 may reject the bid. For example, if the third party advertisement server 108 determines or predicts that it can sell the inventory on the content page to an advertiser 110 for $0.13, the bid may be rejected. The third party advertisement server 108 need not have any particular reason to reject the bid. In practice, the bid may be rejected for any reason, not limited to bid amounts and profit. If the bid is rejected, the response from the third party advertisement server 108 may include the advertisement that is to be displayed in the content page. In such cases, the browser 120 displays the received advertisement in its proper location in the content page. In some embodiments, the third party advertisement server 108 may submit a counter-proposal to the browser 120, and a negotiation may result.

As described above, the process 600 may alternatively be implemented by an intermediary system 104. For example, the content retrieval module 140 or some other component of the intermediary system 104 may receive content requests from the client device 102, and then retrieve the requested content from the content server 106 on behalf of the client device 102. The remote browser 148 may then be employed to process the content so that it may be transmitted to the client device 102 in a pre-processed or pre-rendered state. Alternatively, the content may be processed only to identify embedded references to other objects, such as advertisements that may then be retrieved on behalf of the client device 102 without requiring a separate request from the client device 102, as might be required in other implementations.

In response to identifying a reference to an advertisement associated with the content, the advertisement server 146, or some other component of the intermediary system 104, can calculate a bid for the inventory corresponding to the advertisement. The bid may be submitted to the third party advertisement server 108 as described above, such as by appending a parameter to a URL query string that is sent to the third party advertisement server 108 or communicating with the third party advertisement server 108 via an API. Subsequently, or in parallel with the bid generation and submission process, an advertisement may be retrieved from the advertisement server 146 associated with the intermediary system 104 so that it may be ready for inclusion in the content page if the bid is accepted by the third party advertisement server 108.

In some embodiments, the intermediary system 104 may request an advertisement from the third party advertisement server 108 and also request that the third party advertisement server 108 offer to sell the right to display an advertisement in the inventory unit. The request can be made by appending a parameter to a query string, communicating via an API, etc. The third party advertisement server 108 can be configured to calculate or otherwise determine a price for the advertisement inventory unit and return the price to the intermediary system 104 along with the advertisement. The intermediary system 104, while waiting for a response from the third party advertisement server 108, can calculate or otherwise determine an amount that the intermediary system would pay for the advertising inventory unit. If the intermediary system 104 determines that it can receive a larger amount than the third party advertisement server 108 proposes, the intermediary system 104 can disregard the advertisement from the third party advertisement server 108, substitute a different and potentially more profitable advertisement, and record information about the transaction so that payments can be made.

For example, the intermediary system 104 may calculate a price in similar fashion to the bid calculation described above, or the intermediary system 104 may contact any number of other advertisement servers to determine an amount that the other advertisement servers would pay for the advertisement inventory unit. Various factors may be considered in the determination of a price by any of the entities, including the recent browse history of the client device 102 and the current content page on which the advertisement will be displayed. If the client device 102 has recently browsed content pages regarding a certain product, such as a camera, then the intermediary system 104 can contact various advertisement servers to determine an amount that an advertisement server would pay to serve a camera advertisement to a client device 102 with such a recent browse history. This targeted advertising may be more valuable to advertisers, and the intermediary server 104 may be able to obtain an amount that is greater than that which the original third party advertisement server 108 is requesting in order to sell the advertisement inventory unit.

In response to receiving a notification that the bid has been accepted by the third party advertisement server 108 or otherwise determining to purchase the inventory unit from the third party advertisement server 108, the intermediary system 104 or some component thereof may insert a substitute advertisement, such as an advertisement retrieved from the advertisement server 146 or some other advertisement server, at the proper location within the content. If the bid was rejected by the third party advertisement server 108, then the advertisement received from the advertisement server 108 may be inserted at the proper location within the content. After any final processing is performed by the remote browser 148, the content may then be transmitted to the client device 102. The browser 120 of the client device 102 may then display the content without any knowledge that the advertising inventory was the subject of a bidding process in between the request for the content and receipt of content from the intermediary system 104.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented in application-specific hardware, or in software executed by hardware, depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. Non-transitory physical computer storage comprising executable code that directs a mobile computing device to perform a process comprising:
maintaining information indicating associations between a plurality of content page servers, including a first content page server, and a plurality of content item servers, including a first content item server, each association indicating that a content page server hosts one or more content pages that include references to one or more content item servers;
obtaining a plurality of content items from the plurality of content item servers;
storing the obtained content items in a cache of the mobile computing device;
obtaining, from the first content page server of the plurality of content page servers, a content page comprising executable code, which upon a respective execution of the executable code generates a request to receive a respective content item from the first content item server associated with the first content page server;
storing, in the mobile computing device, the content page for offline presentation;
providing the stored content page for presentation while the mobile computing device does not have an active network connection, wherein providing the stored content page for presentation includes generating a request to receive a first content item from the first content item server and accessing the cache to obtain the first content item;
determining that the first content item is not stored in the cache;
obtaining, from the cache based on the maintained information, a second content item obtained from a second content item server associated with the first content page server such that the second content item server is referenced in one or more content pages hosted by the first content page server; and
causing presentation of the second content item.

2. The non-transitory physical computer storage of claim 1 wherein the content page comprises a web page.

3. The non-transitory physical computer storage of claim 1 wherein the second content item comprises at least one of the following: an image, video, animation, audio recording, applet, document, or file.

4. The non-transitory physical computer storage of claim 1 wherein the plurality of content items obtained from the content item servers comprise advertisements obtained from advertising servers.

5. The non-transitory physical computer storage of claim 1 wherein the process further comprises queuing an impression notification associated with the second content item.

6. The non-transitory physical computer storage of claim 5 wherein the process further comprises transmitting, to an impression tracking system, the queued impression notification in response to the mobile computing device establishing a network connection.

7. The non-transitory physical computer storage of claim 6 wherein transmitting the queued impression notification comprises requesting a tracking object associated with the second content item from the impression tracking system.

8. The non-transitory physical computer storage of claim 6 wherein transmitting the queued impression notification comprises interacting with the impression tracking system via an application programming interface (API).

9. A computing device comprising one or more computer processors and one or more computer storage media storing instructions, that when executed by the one or more computer processors, cause the one or more computer processors to perform operations comprising:
   maintaining information indicating associations between a plurality of content page servers, including a first content page server, and a plurality of content item servers, including a first content item server, each association indicating that a content page server hosts one or more content pages that include references to one or more content item servers;
   obtaining a plurality of content items from the plurality of content item servers;
   storing the obtained content items in a cache of the computing device;
   obtaining, from the first content page server of the plurality of content page servers, a content page comprising executable code, which upon a respective execution of the executable code generates a request to receive a respective content item from the first content item server associated with the first content page server;
   storing, in the computing device, the content page for offline presentation;
   providing the stored content page for presentation while the computing device does not have an active network connection, wherein providing the stored content page for presentation includes generating a request to receive a first content item from the first content item server and accessing the cache to obtain the first content item;
   determining that the first content item is not stored in the cache;
   obtaining, from the cache based on the maintained information, a second content item obtained from a second content item server associated with the first content page server such that the second content item server is referenced in one or more content pages hosted by the first content page server; and
   causing presentation of the second content item.

10. The computing device of claim 9, wherein the content page comprises a web page.

11. The computing device of claim 9, wherein the second content item comprises at least one of the following: an image, video, animation, audio recording, applet, document, or file.

12. The computing device of claim 9, wherein the plurality of content items obtained from content item servers comprise advertisements obtained from advertising servers.

13. The computing device of claim 9, wherein the operations further comprise queuing an impression notification associated with the second content item.

14. The computing device of claim 13, wherein the operations further comprise transmitting, to an impression tracking system, the queued impression notification in response to the computing device establishing a network connection.

15. The computing device of claim 14, wherein transmitting the queued impression notification comprises requesting a tracking object associated with the second content item from the impression tracking system.

16. The computing device of claim 14, wherein transmitting the queued impression notification comprises interacting with the impression tracking system via an application programming interface (API).

17. A computer-implemented method comprising:
   as implemented by a mobile computing device comprising one or more computer processors,
   maintaining information indicating associations between a plurality of content page servers, including a first content page server, and a plurality of content item servers, including a first content item server, each association indicating that a content page server hosts one or more content pages that include references to one or more content item servers;
   obtaining a plurality of content items from the plurality of content item servers;
   storing the obtained content items in a cache of the mobile computing device;
   obtaining, from the first content page server of the plurality of content page servers, a content page comprising executable code, which upon a respective execution of the executable code generates a request to receive a respective content item from the first content item server associated with the first content page server;
   storing, in the mobile computing device, the content page for offline presentation;
   providing the stored content page for presentation while the mobile computing device does not have an active network connection, wherein providing the stored content page for presentation includes generating a request to receive a first content item from the first content item server and accessing the cache to obtain the first content item;
   determining that the first content item is not stored in the cache;
   obtaining, from the cache based on the maintained information, a second content item obtained from a second content item server associated with the first content page server such that the second content item server is referenced in one or more content pages hosted by the first content page server; and
   causing presentation of the second content item.

18. The computer-implemented method of claim 17, wherein the content page comprises a web page.

19. The computer-implemented method of claim 17, wherein the second content item comprises at least one of the following: an image, video, animation, audio recording, applet, document, or file.

20. The computer-implemented method of claim 17, wherein the plurality of content items obtained from the content item servers comprise advertisements obtained from advertising servers.

21. The computer-implemented method of claim 17, further comprising queuing an impression notification associated with the second content item.

22. The computer-implemented method of claim 21, further comprising transmitting, to an impression tracking system, the queued impression notification in response to the mobile computing device establishing a network connection.

23. The computer-implemented method of claim 22, wherein transmitting the queued impression notification comprises requesting a tracking object associated with the second content item from the impression tracking system.

24. The computer-implemented method of claim 22, wherein transmitting the queued impression notification comprises interacting with the impression tracking system via an application programming interface (API).

25. The non-transitory physical computer storage of claim 1, wherein storing the content page for offline display includes generating a request to receive a particular content item, and storing the particular content item, wherein the particular content item is different from the first content item.

26. The computing device of claim 9, wherein storing the content page for offline display includes generating a request to receive a particular content item, and storing the particular content item, wherein the particular content item is different from the first content item.

27. The computer-implemented method of claim 17, wherein storing the content page for offline display includes generating a request to receive a particular content item, and storing the particular content item, wherein the particular content item is different from the first content item.

28. The non-transitory physical computer storage of claim 1, wherein the first content item server is different from the second content item server.

* * * * *